Jan. 14, 1941.  A. U. WETHERBEE  2,228,492
METHOD OF PACKAGING FOOD PRODUCTS
Original Filed June 8, 1935   2 Sheets-Sheet 1
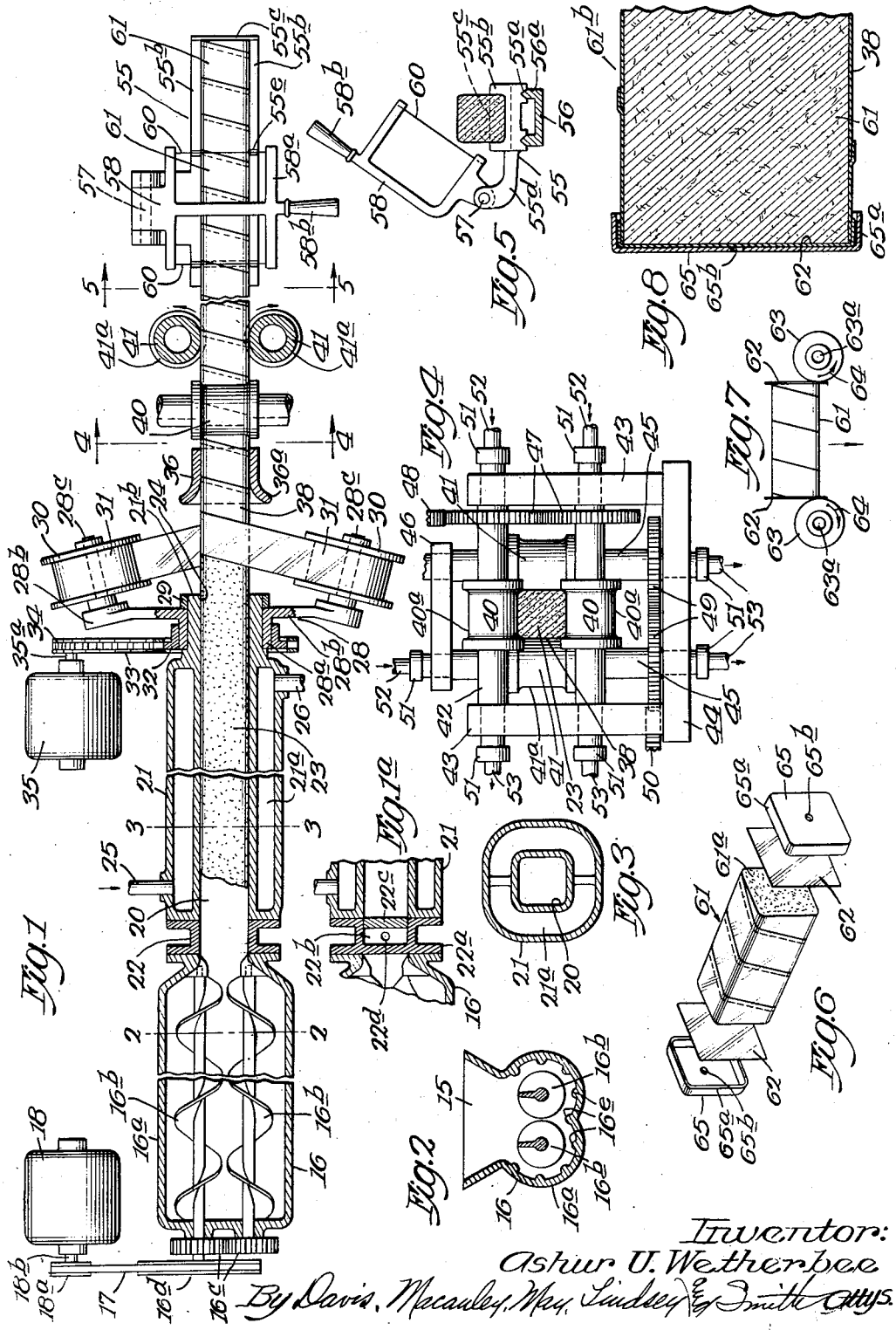
Inventor:
Ashur U. Wetherbee
By Davis, Macauley, May, Lindsey & Smith Attys.

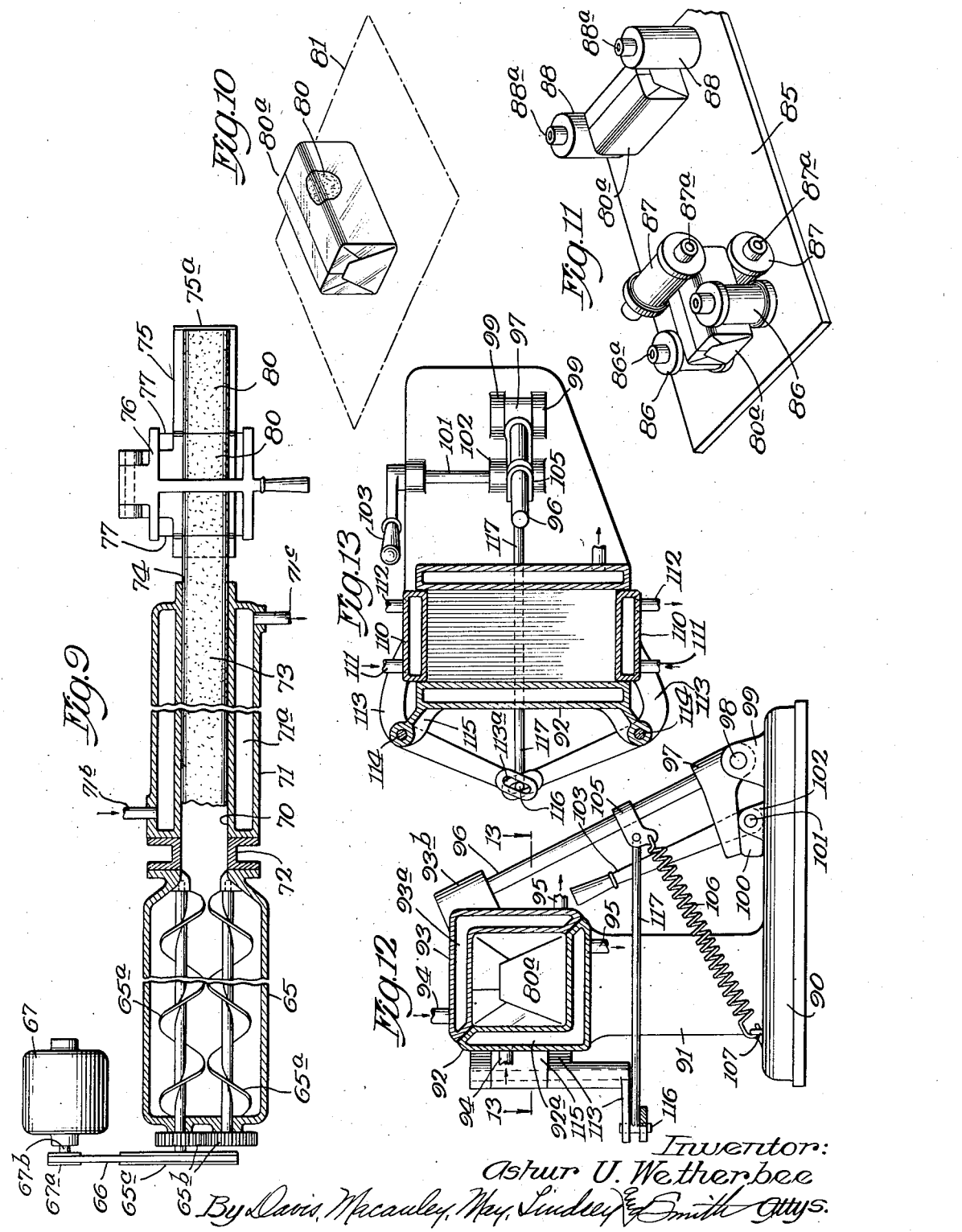

Patented Jan. 14, 1941

2,228,492

UNITED STATES PATENT OFFICE 2,228,492

METHOD OF PACKAGING FOOD PRODUCTS

Ashur U. Wetherbee, Evanston, Ill., assignor to Kraft Cheese Company, Chicago, Ill., a corporation of Delaware Application June 8, 1935, Serial No. 25,550
Renewed June 14, 1940

5 Claims. (Cl. 99—171)

This invention relates to an improved method of packaging food products, such as cheese and other dairy products, and to an improved form of apparatus for use in the practice of the method. It is often necessary or desirable to package cheese, butter, lard and other food products while they are in a more or less plastic condition, and sometimes in a heated state, and the principal object of the present invention is to provide an improved method of treating such products and putting them in packaged form in units of convenient commercial size, each unit consisting of a solidified block of the food product having applied thereto a closely adhering covering of tinfoil or other wrapping material by which the contents of the package are protected from contact with air until the package is opened by the consumer. By the practice of this method, an improved package may be quickly and conveniently formed and the food product is protected against contamination by bacteria and the like so that it may be kept in an edible condition for a very long period of time. A further object of the invention is to provide an improved method of packaging according to which the food product in a plastic condition, and preferably in a heated state, is subjected while in motion through a tube to the action of a surrounding cooling fluid, thereby producing an elongated moving body of the solidified food product about which a wrapping of tinfoil or the like is continuously applied while the body of material is in motion, after which the body is cut up into units of convenient size and protective coverings are applied to the end surfaces which have not previously been wrapped. These steps of the process are preferably followed by the application of heat to the wrapping of each unit so that the wrappings are caused to adhere more closely to the confined product. A further object of the invention is to provide an improved method of packaging according to which a moving body of the material is wrapped and cut into units in a continuous process. Still another object of the invention is to provide improved apparatus for packaging food products and the like comprising an elongated tube through which the plastic food products are moved by a suitable feeding device while being subjected to the action of a surrounding cooling fluid so that the food product is solidified and caused to assume the form of an elongated bar, in combination with means for wrapping tinfoil or the like about the elongated bar, means for cutting up the wrapped bar into units and means for subjecting the wrapping and the confined food product to the action of heat. Other objects relate to various details of the method and to improved features of the apparatus which will appear more fully hereinafter.

The nature of the invention will be understood from the following specification taken with the accompanying drawings, in which two examples of the improved method are illustrated in connection with the disclosure of two forms of improved apparatus which may be employed in practicing the method.

In the drawings,

Fig. 1 shows a somewhat diagrammatic longitudinal sectional view taken through the central axis of one form of apparatus which may be employed in the practice of the method of the present invention;

Fig. 1ᵃ is a partial sectional view similar to that of Fig. 1, showing a device which may be employed for clearing the tube illustrated in Fig. 1 of the food product after the completion of a packaging operation;

Fig. 2 shows a sectional view taken on the line 2—2 of Fig. 1;

Fig. 3 shows a sectional view taken on the line 3—3 of Fig. 1;

Fig. 4 shows a sectional view taken on the line 4—4 of Fig. 1;

Fig. 5 shows a sectional view taken on the line 5—5 of Fig. 1;

Fig. 6 is a perspective view of the separate elements of the completed food package showing the wrapped body of food material, the separated end coverings, and separated end caps or plates;

Fig. 7 is a view of apparatus employed for applying the end coverings to the wrapped bar of food material;

Fig. 8 shows an enlarged longitudinal section through one end portion of a completed food package formed with the use of the apparatus disclosed in Figs. 1, 2, 3, 4, 5 and 7;

Fig. 9 is a longitudinal sectional view similar to that of Fig. 1, through a modified form of apparatus which may be employed for practicing the present invention;

Fig. 10 is a perspective view of a wrapped block of the food product produced by the use of the apparatus illustrated in Fig. 9, illustrating by dotted lines the sheet of wrapping material prior to its application to the body to be wrapped;

Fig. 11 is a perspective view of apparatus by which heat and pressure may be applied to the wrapped body illustrated in Fig. 10;

Fig. 12 shows a transverse vertical section through one form of apparatus which may be employed for applying heat and pressure to the wrapped body illustrated in Fig. 10; and Fig. 13 is a horizontal section taken on the line 13—13 of Fig. 12.

The form of the apparatus illustrated in Fig. 1 comprises a hopper 15 adapted to receive the food product in a plastic or semi-plastic state. This food product may be Cheddar cheese, for example, which has been ground up and subjected to the action of heat at a temperature somewhat below the boiling point of water, for the purpose of effecting the pasteurization thereof, or it may be any other food product which is in a sufficiently plastic or semi-plastic condition to permit it to be expelled through a tube by the operation of the feeding device 16 into which the material flows from the hopper 15. The feeding device comprises a casing 16ª having mounted therein a pair of rotatable screw conveyors 16ᵇ which are journaled at their ends in the walls of the casing. The shafts of these screw conveyors project through the casing at one end and have mounted thereon intermeshing gears 16ᶜ. On one of these shafts, there is mounted a grooved pulley 16ᵈ adapted to be driven by a belt 17 from a pulley 18ª mounted upon the shaft 18ᵇ of an electric motor 18. As the screw conveyors 16ᵇ are rotated, they are adapted to expel the cheese or other plastic food product from the casing 16ª through a tubular passage 20 and, for the purpose of preventing the food product from revolving with the screw conveyors, the inner surface of the casing 16ª is provided with a rifling effect by longitudinal ribs 16ᵉ. Any other suitable feeding device may be employed in place of the feeding device 16.

The passage 20 through which the cheese or other food product is discharged by the feeding device 16 is formed primarily in the casing 21 and partly in an intermediate casing 22 which is interposed between the casing 21 and the casing 16ª. All of these casings are suitably connected together to form a rigid and substantial unitary construction. By the action of the feeding device there is thus formed in the tubular passage 20 an elongated bar 23 of cheese or the like which has a cross-section corresponding to the cross-section of the passage 20. This may preferably be rectangular in order that the resulting bars of the food product will have a bricklike form. The plastic food product is continuously supplied to the hopper 15 and the continuously operating screw conveyors cause a progressive formation of the bar 23, with the result that it is pushed or extruded from the mouth or orifice 24 at the end of the passage 20. For the purpose of solidifying the cheese or other food product before the bar 23 reaches the mouth or orifice 24, the casing 21 is provided with a water jacket 21ª having connected thereto an inlet pipe 25 and an outlet pipe 26, which permits cold water, brine, or other cooling fluid from a suitable source of supply to be circulated through the jacket 21ª. Since this jacket surrounds the passage 20, the effect of the cooling fluid is to bring about a gradual solidification of the plastic mass which is discharged into the passage 20 from the feeding device and the bar 23 thus emerges from the orifice 24 in the form of a member which is sufficiently solid and self-sustaining to permit the application thereto of a suitable wrapping. The wall of the passage 20 may preferably be formed of aluminum since it has been found that chilled cheese and the like do not stick to this material.

The wrapping of the bar 23 may preferably be effected by applying thereto a helical winding of tinfoil or the like as it emerges from the orifice 24 and for this purpose there is provided a spider 28 having a hub 28ª which is rotatably mounted upon the outer end portion 21ᵇ of the casing 21 with a collar 29 secured to the portion 21ᵇ in order to retain the spider in position thereon. The spider 28 carries two or more arms 28ᵇ having spindles 28ᶜ mounted in the outer ends thereof. On each of these spindles there is rotatably mounted a reel or drum 30 which carries a coil of wrapping material 31 which may be in the form of a long strip of tinfoil or other material which is preferably impervious to air and moisture. The hub 28ª of the spider 28 has a sprocket wheel 32 fixed thereon and adapted to be driven by a sprocket chain 33 passing around a sprocket wheel 34 fixed upon the shaft 35ª of an adjustable speed motor 35. The motor 35 is adapted to drive the spider 28 at a comparatively low speed which is regulated so that as the bar 23 of cheese or the like is extruded from the orifice 24, two or more strips of tinfoil are wound thereon in overlapping relationship to each other by the reels 30 which slowly revolve about the bar 23. The wrapped bar passes into and through a tubular guide member 36 which is outwardly flared at its inlet end 36ª and which serves to support the advancing bar of cheese or the like while it is being wrapped.

It is desirable to apply pressure to the helical wrapping 38 which is thus formed on the solidified bar of cheese or the like in order to press the wrapping closely against the cheese and thereby exclude air which may have been entrapped beneath the wrapping. For this purpose, there are provided a pair of rolls 40 which are adapted to engage the upper and lower sides of the rectangular bar of cheese or the like, as shown particularly in Fig. 4, and also a pair of similar rolls 41 which are adapted to engage the lateral sides of the wrapped bar. The rolls 40 are grooved as shown at 40ª to engage the upper and lower sides of the wrapped bar and the ends of these grooves are rounded so that the tinfoil is pressed against the rounded corners of the wrapped bar as it passes between them, the corners of the bar being preferably rounded by the extrusion tube. The rolls 41 are similarly provided with grooves 41ª which are curved at their ends for the same purpose. The rolls 40 are mounted on hollow axles or shafts 42 which are journaled in upright frame members 43 carried by a supporting member 44 and the rolls 41 are similarly mounted upon hollow axles or shafts 45 which extend vertically with their ends journaled in the member 44 and in a horizontal frame member 46. The shafts 42 are connected together by gears 47 and one of these gears is driven by an intermeshing gear 48 so that the rolls 40 are positively rotated and thus assist in advancing the wrapped cheese bar after it has been extruded from the passage 20. The shafts 45 of the rollers 41 are similarly connected together by intermeshing gears 49, one of which is driven by a gear 50 so that the rolls 41 also assist in moving the wrapped bar. The ends of the shafts 42 and 45 are connected through fluid-tight joints 51 with inlet pipes 52 and outlet pipes 53 through which hot water, steam or the like from a suitable source of supply may be led into or discharged from the hollow shafts and rolls during their rotation. In this way, the external surface layers of the bar of cheese or the like may be heated to a relatively high temperature, for example, from 150 to 175 degrees Fahrenheit, so that the surface layers are rendered momentarily soft and plastic, thus facilitating the action of the pressure rolls 40 and 41 in pressing the helical wrapping 38 into close air-excluding contact with the body of cheese or the like.

After emerging from the rollers 40 and 41, the wrapped cheese bar passes into an elongated guide member 55 which is mounted to slide longitudinally on a supporting member 56 having tracks 56$^a$ which engage grooves 55$^a$ in the bottom of the guide table. This guide table has side walls 55$^b$ which engage the lower portions of the sides of the wrapped bar and it is provided at its end with a flange or lip 55$^c$ which engages the end of the extruded bar. The guide table 55 carries a bracket 55$^d$ upon which there is pivotally mounted at 57 a cutting device 58 which is illustrated as having laterally extending arms 58$^a$ between which extend a plurality of wires or blades 60 which are adapted to sever the bar of cheese or the like and its wrapping when the cutting device 58 is swung about its pivot by the application of pressure to the handle 58$^b$. The side walls 55$^b$ and the bottom of the guide table are provided with notches 55$^e$, as shown in Fig. 1, to permit the cutting member 60 to pass downwardly through the bottom of the wrapped bar. The cutting members 60 are spaced apart a distance equal to the desired length of one bar or brick of the wrapped food product, and the right-hand cutting member 60, as viewed in Fig. 1, is spaced the same distance from the flange or lip 55$^c$ which is adapted to engage the end of the bar 23. Thus, after bringing the lip 55$^c$ into engagement with the end of the bar, and then moving the cutting device 58 to cause the cutting member 60 to pass through the bar and its wrapping, a plurality of bar sections 61 are simultaneously separated from the elongated bar which is being continuously wrapped by the reels 30. During this operation of cutting, the table 55 moves along the support 56 to accommodate itself to the continuous advance of the bar 23 and after the cutting device 58 has been operated to separate the sections, these sections are removed from the table and the table is then moved toward the left, as viewed in Fig. 1, until the lip or flange 55$^c$ again engages the end of the wrapped bar.

The wrapped sections 61 which are produced by the operation of the cutting device 58 upon the wrapped bar, have the form shown particularly in Fig. 6, each section having an uncovered end surface 61$^a$ where the cheese or other wrapped product is exposed, and in order to protect these surfaces, sheets 62 of tinfoil or the like are pressed against these end surfaces. This may be done by putting the tinfoil sheets against the end surfaces of the body of cheese or the like and then passing the section 61 transversely between a pair of hollow heated rolls 63, as shown in Fig. 7. These rolls are positively rotated in the direction indicated by the arrow 64 and have passageways 63$^a$ therethrough to permit the circulation of hot water, steam or the like for heating the rolls and thus causing them to effect a slight melting or softening of the layers of cheese at the end of the section 61, with the result that the layers 62 of tinfoil or the like are caused to adhere closely thereto. These sheets 62 may preferably be slightly larger in area than the cross-section of the bar 61 and the wrapping of the package is preferably completed by applying to each end of the section 61 a rectangular metal cap 65 having annular flanges 65$^a$ which are adapted to overlap the ends of the outer surfaces of the section 61 and to bend the edges of the sheet 62 about these lateral surfaces. Each cap member 65 may be provided with an aperture 65$^b$ to permit the escape of air therein while it is being pressed into position on one end of the section 61. There thus results the complete package of cheese or the like having the form illustrated at 61$^b$ in Fig. 8.

At the completion of a run of the apparatus illustrated in Fig. 1, it may be desirable to clean the passage of all remnants of the cheese or other food product which has been packaged in the operation which has just been concluded and for this purpose, the casing section 22 may be removed and a substitute section 22$^a$, having the form shown in Fig. 1$^a$, may be substituted for it. The casing section 22$^a$ has formed therein a chamber 22$^b$, one end of which is closed while the other end has mounted therein a movable piston or disk 22$^c$. Steam or other fluid under pressure may be admitted to the chamber 22$^b$ through an opening 22$^d$, which will then cause the disk or piston 22$^c$ to travel throughout the length of the passage 20 until it is discharged through the orifice or mouth 24, thereby cleaning the passage 20 of all of the food material which has remained therein.

In Figs. 9, 11, 12 and 13 there is shown an arrangement of apparatus which may be employed in forming a wrapped package comprising a wrapping of sheet form, as distinguished from the helical wrapping which has heretofore been described. As shown in Fig. 9, there is a casing 65 having mounted therein a pair of screw conveyors 65$^a$ adapted to move from the casing the cheese or other food product which is fed into the casing more or less continuously through a hopper as in the form of apparatus previously described. The shafts of the screw conveyor 65$^a$ are journaled in the ends of the casing and at one end of the casing they project therefrom to be connected together by intermeshing gears 65$^b$. One of these shafts has mounted thereon a grooved pulley 65$^c$ adapted to be connected by a belt 66 with another grooved pulley 67$^a$ mounted on the shaft 67$^b$ of an electric motor 67. In this way, the screw conveyors 65$^a$ are rotated in opposite directions to feed the plastic cheese or the like from the casing 65 and advance it through a tubular passage 70 which may be rectangular in form and which is adapted to cause the body of cheese or the like to assume the form of an elongated moving bar. This passage 70 is formed partly in a casing 71 and partly in an intermediate casing 72 and as the cheese or the like is moved through the passage 70 it is caused to assume the form of a bar 73. For the purpose of solidifying the plastic material as it is advanced through the passage 70, the casing 71 is provided with a water jacket 71$^a$ having connected thereto an inlet pipe 71$^b$ and an outlet pipe 71$^c$. Cold water or the like is adapted to be circulated through the water jacket 71$^a$, thus causing the contents of the passage 70 to be solidified and to assume the form of a substantially self-sustaining bar 73 before this bar emerges from the mouth or orifice 74 at the discharge end of the passage.

Instead of wrapping the bar 73 as it emerges from the orifice 74, the bar is first cut up into sections and these sections are afterwards wrapped. For this purpose, the extruded bar 73 is caused to pass from the orifice 74 into a guide member 75 which is identical in construction with that previously described, having mounted thereon a cutting device 76 provided with cutting blades 77 which are spaced apart a distance equal to the length of each brick or section of cheese or the like to be wrapped. As in the form of construction previously described, the guide member 75 is provided at its end with a lip or flange 75ª adapted to engage the end of the bar of cheese and the right-hand cutting blade 77, as viewed in Fig. 9, is spaced from this lip or flange 75ª a distance equal to the length of each brick or section of cheese or the like to be wrapped. After the operation of the cutting device 76, which results in cutting off two or more sections 80 of cheese or the like, the movable guide table 75 is moved along its support until the lip or flange 75ª again engages the end of the bar 73 which is being extruded through the orifice 74. Each section 80 is then placed upon a rectangular sheet 81 of tinfoil or the like, as shown by dotted lines in Fig. 10, and this sheet is then wrapped about the section 80 to form the wrapped body 80ª shown by full lines in Fig. 10.

After the wrapped package 80ª has been formed as shown in Fig. 10, pressure is applied to the wrapping to force it into firm contact with the block 80 contained within it and heat is also preferably applied in order to effect the softening of the surface layer of the block. This may be done by the use of the apparatus shown in Fig. 11, which is illustrated somewhat diagrammatically as comprising a supporting member 85 upon which are mounted two vertically extending grooved rolls 86 which are adapted to press against the lateral sides of the wrapped package 80ª as it is passed between them. These rolls have hollow shafts as shown at 86ª so that hot water, steam or the like may be circulated therethrough during their rotation for the purpose of applying heat to the wrapped package and effecting a slight melting or softening of the surface layer of the cheese or the like contained therein. These rolls may be power-driven as in the form of construction previously described. Adjacent to the rolls 86 are a pair of horizontally extending rolls 87 which are adapted to engage the upper and lower sides of the package and which have passages 87ª therethrough to permit hot water, steam or the like to be circulated therethrough for the purpose of softening the upper and lower surface layers of the body of cheese or the like while it is being compressed between these rolls. After passing through the rolls 86 and 87, the package is reversed in position and moved between two other spaced rolls 88 which are mounted to revolve about vertical axes and which are spaced apart a distance substantially equal to the length of the package so that they compress the end layers of the wrapping into close contact with the cheese or the like. These rolls have passages 88ª therethrough so that hot water, steam or the like may be circulated therethrough to cause the softening of the ends of the block while it is being compressed. Any of the rolls and pressure members which have been described as being heated by hot water or steam may be heated in other ways suitable for the purpose.

Instead of employing the apparatus shown in Fig. 11, the wrapped package illustrated in Fig. 10 may be compressed and heated by the form of apparatus shown in Figs. 12 and 13. This apparatus comprises a base 90 having mounted thereon an upwardly extending standard 91, upon which is mounted a pressure member 92 adapted to cooperate with a similar relatively movable pressure member 93 in compressing the package of rectangular cross-section between them. Each of the pressure members 92 and 93 is of angular cross-section to conform to two sides of the wrapped package and they have diagonal end surfaces extending parallel to each other which are adapted to engage each other when the limit of compression is reached. The pressure member 92 has a hollow water jacket 92ª formed therein and the member 93 has a similar water jacket 93ª. Hot water, steam or the like is adapted to be circulated through these water jackets by means of inlet pipes 94 and outlet pipes 95 which are connected thereto. The pressure member 93 is provided with a projecting boss 93ᵇ having an aperture in which is secured a supporting rod 96. This rod is secured at its lower end in a bracket 97 which is in turn pivoted at 98 between a pair of ears 99 extending upwardly from the base 90. The bracket 97 is adapted to be engaged by a cam 100 secured on a shaft 101 which is journaled in members 102 extending upwardly from the base 90 and which has an operating handle 103 secured to one end thereof. A clamp 105 is secured to an intermediate part of the rod 96 and a coil spring 106 is connected with one end of this clamp and at the other end to a member 107 attached to the base 90 so that this spring normally tends to move the pressure member 93 to a position where it engages and tends to compress the wrapped cheese body 80ª.

For the purpose of compressing and applying heat to the ends of the wrapped package 80ª, two other pressure members 110 of rectangular cross-section are provided to fit between the end portions of the pressure members 92 and 93, as shown in Fig. 13. Each of these pressure members is hollow and has connected thereto an inlet pipe 111 and an outlet pipe 112 so that hot water, steam or the like may be circulated therethrough while the package of cheese or the like is being compressed. Each of the pressure members 110 is carried by a supporting lever 113 which is pivoted at 114 on one of the brackets 115 carried by the pressure member 92. These levers 113 are of bell crank form and are provided at their outer ends with elongated slots 113ª which are engaged by a vertically extending pin 116 mounted on the end of an operating rod 117 which is attached at its forward end to the previously described clamp 105 carried by the rod 96. By moving the operating lever 103 toward the right as viewed in Fig. 12, the cam 100 is caused to swing the rod 96 about its pivot and thus move the pressure member 93 away from the pressure member 92. At the same time, the rod 117 actuates the levers 113 to effect a relative separation of the pressure members 110 so that the package-receiving cavity is then open to permit the insertion of the wrapped package. When the package has been inserted, the lever 103 is restored to the position shown in Fig. 12 and the coil spring 106 will then serve not only to press the pressure member 93 against the package but also to cause a similar pressure to be exerted on the ends of the package by the pressure member 110.

If the plastic food product is not in a heated condition, it may sometimes be compacted and rendered substantially self-sustaining by moving it under pressure through a confining passage, such as the passage 20, without the application of the cooling medium, and the resulting bar may then be cut into sections and wrapped. A food product which is initially in bar form may be readily cut into sections and wrapped by means of the improvements of the present invention.

Although certain forms of the improved apparatus have been shown and described in connection with the disclosure of the improved method of packaging food products and the like, it will be understood that the apparatus may be constructed in various forms and that the method may be practiced in various ways coming within the scope of the appended claims.

I claim:

1. The method of packaging a heated plastic cheese product which consists in cooling and hardening the product and extruding it through an orifice, cutting the extruded product into sections, and wrapping the sections.

2. The method of packaging a plastic cheese product initially in a heated condition, which consists in cooling and hardening the product and forming an elongated bar thereof, cutting said bar into sections, and then wrapping said sections.

3. The method of packaging a plastic cheese product initially in a heated condition, which consists in cooling and hardening the product and forming an elongated bar thereof, cutting said bar into sections, wrapping said sections and then applying heat to the outside of the wrapping.

4. The method of packaging a plastic cheese product initially in a heated condition, which consists in cooling said product and forming an elongated self-sustaining bar thereof, cutting said bar into sections, and then wrapping said sections, all of said operations being carried on as a continuous process.

5. The method of packaging said food product initially in a heated condition, which consists in cooling the product by a surrounding cooling medium while moving it under pressure through a passage, cutting the resulting bar of said product into sections, wrapping said sections, and then applying heat and pressure to the wrapping, all of said operations being carried on as a continuous process.

ASHUR U. WETHERBEE.